United States Patent
Shirai

(10) Patent No.: US 7,852,597 B2
(45) Date of Patent: Dec. 14, 2010

(54) STORAGE MEDIUM DRIVING APPARATUS AND CONTROL METHOD THEREOF

(75) Inventor: Katsumi Shirai, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 1 day.

(21) Appl. No.: 12/402,094

(22) Filed: Mar. 11, 2009

(65) Prior Publication Data
US 2009/0237840 A1 Sep. 24, 2009

(30) Foreign Application Priority Data
Mar. 19, 2008 (JP) ............................. 2008-070959

(51) Int. Cl.
G11B 21/02 (2006.01)
G11B 15/18 (2006.01)
G11B 19/02 (2006.01)

(52) U.S. Cl. ............................. 360/75; 360/69; 360/71

(58) Field of Classification Search ....................... None
See application file for complete search history.

(56) References Cited

U.S. PATENT DOCUMENTS

| | | | |
|---|---|---|---|
| 4,636,884 A * | 1/1987 | Hattori et al. ............ | 360/78.13 |
| 6,995,944 B1 | 2/2006 | Takaishi et al. | |
| 7,023,640 B1 * | 4/2006 | Codilian et al. ............... | 360/60 |
| 7,031,094 B2 | 4/2006 | Chung | |
| 7,136,256 B2 | 11/2006 | Takaishi et al. | |
| 2004/0114269 A1 * | 6/2004 | Ito ............................. | 360/75 |
| 2006/0152842 A1 * | 7/2006 | Pasolini et al. ................ | 360/75 |
| 2007/0086108 A1 | 4/2007 | Kuroki et al. | |
| 2009/0027798 A1 * | 1/2009 | Shu et al. ...................... | 360/75 |

FOREIGN PATENT DOCUMENTS

| JP | A 6-103712 | 4/1994 |
|---|---|---|
| JP | B2 3821642 | 9/2006 |
| JP | A 2007-115309 | 5/2007 |

\* cited by examiner

*Primary Examiner*—Andrew L Sniezek
(74) *Attorney, Agent, or Firm*—Greer, Burns & Crain, Ltd.

(57) ABSTRACT

A storage medium driving apparatus includes a head slider opposed to a storage medium, an acceleration detector detecting an acceleration of the apparatus. A control circuit retracts the head slider from above the storage medium according to a result detected by the acceleration detector and selectively executes one or more operations from among a plurality kinds of operations according to an index that is derived from the result detected by the acceleration detector and represents an amount of an impact energy.

10 Claims, 6 Drawing Sheets

STORAGE MEDIUM DRIVING APPARATUS AND CONTROL METHOD THEREOF

CROSS-REFERENCE TO RELATED APPLICATIONS

This application is based upon and claims the benefit of priority of prior Japanese Patent Application No. 2008-70959, filed on Mar. 19, 2008, the entire contents of which are incorporated herein by reference

FIELD

The example discussed herein is related to a storage medium driving apparatus.

BACKGROUND

Hard Disk Drives (HDDs) including an acceleration sensor have been widely known. When the HDD is dropped, the HDD itself detects the drop from an output from the acceleration sensor. Upon detecting the drop, heads are retracted from above magnetic disks. Therefore, damaging the heads and the magnetic disks on impact may be prevented.

Related documents are U.S. Pat. No. 7,031,094, Japanese Laid-open Patent Publication No. 2007-115309, Japanese Laid-open Patent Publication No. 06-103712, and Japanese Patent No. 3,821,642.

When the HDD is subjected to the drop impact, the magnetic disks may become misaligned in a radial direction or a spindle motor may be shifted. The misalignment of the disks or the spindle leads to a deterioration of an HDD's performance. For example, a correction value of the servo signal has a margin of error. As a result, data writing or reading takes much time.

SUMMARY

According to an aspect of the embodiment, a storage medium driving apparatus driving a storage medium includes a head slider opposed to the storage medium, and an acceleration detector detecting an acceleration. A control circuit retracts the head slider from above the storage medium according to a result detected by the acceleration detector and selectively executes one or more operations from among a plurality of kinds of operations according to an index that is derived from the result detected by the acceleration detector. The detected result represents an amount of an impact energy caused by a drop, after retracting the head slider.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

Hereinafter, an embodiment of this technique will be disclosed with reference to the accompanying drawings.

Figure 1:
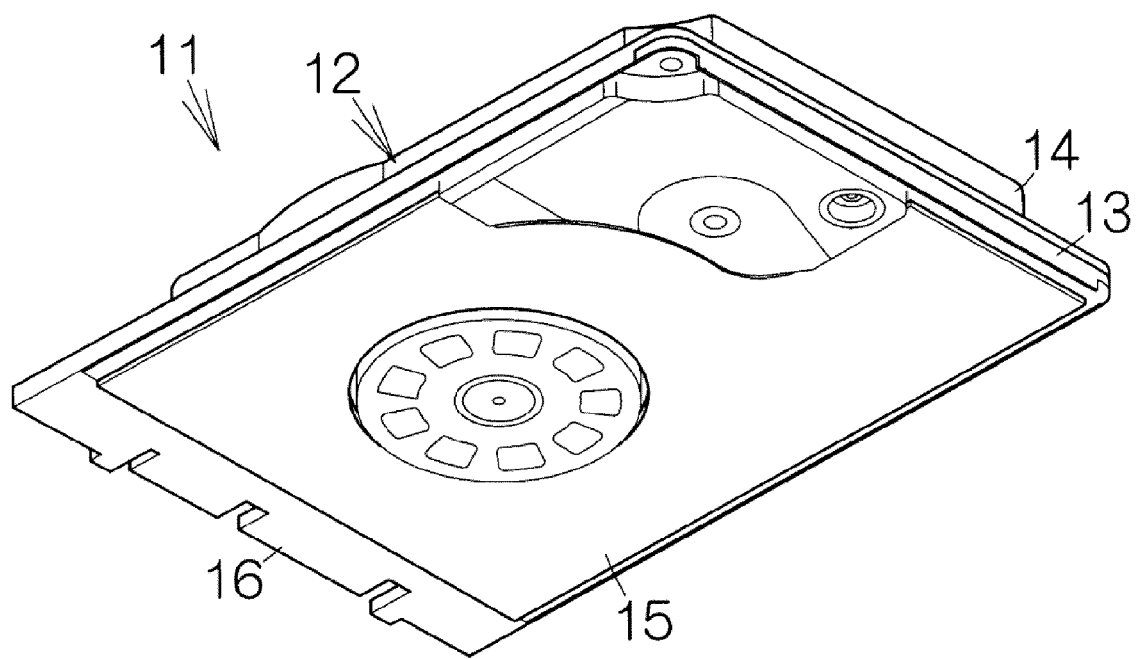
FIG. 1 is a schematic perspective view of an embodiment of the storage medium driving apparatus according to this technique, i.e., the HDD.

FIG. 1 illustrates an exterior of an embodiment of the storage medium driving apparatus using the present technique, a hard disk drive (HDD) 11, schematically. The HDD 11 has a box-shaped enclosure, a housing 12. The housing 12 has a box-shaped base 13 and a cover 14. The base 13 encloses, for example, a flat rectangular solid space, for example, an internal space. The cover 14 covers an aperture of the base 13. The cover 14 and the base 13 seal the internal space therebetween. The base 13 and the cover 14 may be made from, for example, a single plate member respectively by pressing. The plate member is made of metallic material such as aluminum. A printed circuit board 15 is attached under the base 13. A connector 16 is connected with the printed circuit board 15.

Figure 2:
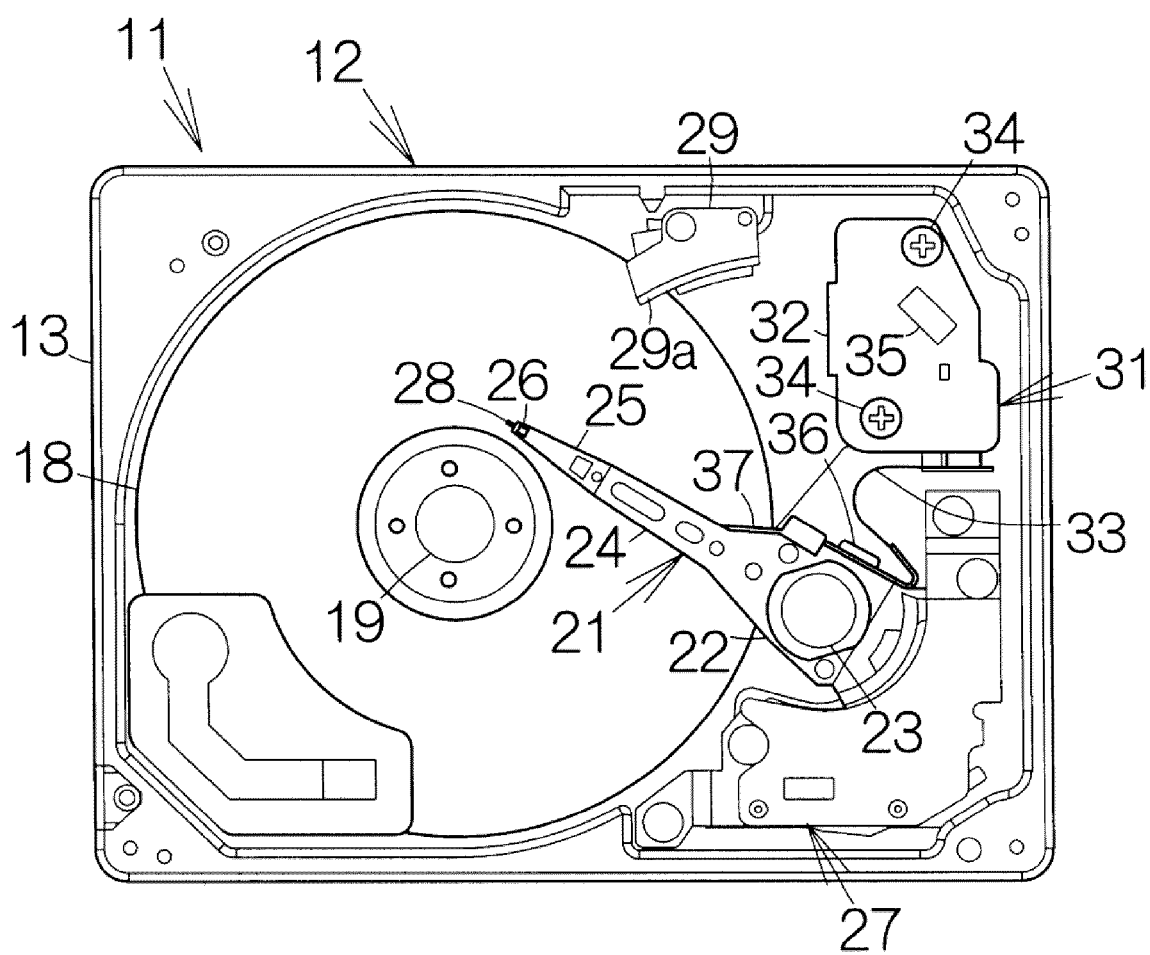
FIG. 2 is a schematic plan view illustrating an internal structure of the HDD.

One or more storage media, magnetic disks, are housed in the internal space as illustrated in FIG. 2. Magnetic disks 18 are mounted on a spindle of a spindle motor 19. The spindle motor 19 spins the magnetic disks 18 at a high speed, for example, 3,600 rpm, 4,200 rpm or 5,400 rpm. The magnetic disks 18 are, for example, 2.5 inches in diameter.

Further, a carriage 21 is housed in the internal space. The carriage 21 has a carriage block 22. The carriage block 22 is supported by a spindle 23 extending upright from a bottom plate of the base 13 rotatably. The spindle 23 is fixed onto the bottom plate of the base 13 with, for example, screws not illustrated in the accompanying drawings. Multiple carriage arms 24 extend from the carriage block 22 in a horizontal direction. The carriage block 22 is made of aluminum by pressing.

A head suspension 25 is attached onto a tip of each carriage arm 24. The head suspension 25 extends forward from the tip of the carriage arm 24. A flexure is affixed onto the head suspension 25. The flexure supports the head slider 26 thereon. The head slider 26 is flexibly supported by the flexure on the head suspension 25. A head element, for example, an electromagnetic conversion element, is affixed onto the head slider.

When airflow is created by spinning magnetic disks 18, a positive pressure, in other words, a lift, and a negative pressure caused by the airflow are exerted on the head slider 26. The head slider 26 is lifted with a relatively a high rigidity by balancing the lift, the negative pressure and a downward force exerted on the head suspension 25 while the magnetic disks 18 are spinning.

The head slider 26 moves in a radial direction of the magnet disk 18 with the rotations of the carriage 21 about the spindle 23 when the head slider 26 is lifted. Therefore, the electromagnetic conversion element affixed onto the head slider 26 moves across the data zone of the magnetic disk 18 from the innermost recording track to the outermost recording track. Thus, the electromagnetic conversion element is positioned above a target recording track.

The carriage block 22 is connected to a power source such as a voice coil motor (VCM) 27. The VCM 27 rotates the carriage block 22 about the spindle 23. The carriage arms 24 and the head suspensions 25 are moved by rotating the carriage block 22.

A load member, load tab 28, is attached onto the tip of the head suspension 25. The load tab extends forward from the tip of the head suspension 25. The load tabs 28 are moved in the radial direction of the magnetic disks 18 by rotating the carriage arms 24. A ramp member 29 is situated beside the magnetic disks 18 on a moving track of the load tabs 28. The ramp member 29 is fixed onto the base 13. The ramp member 29 catches the load tabs 28. The ramp member 29 is made of, for example, rigid plastic material by molding.

The ramp member 29 has ramps 29a extending along the moving track of the load tabs 28. The ramps 29a are situated so as to move away from the center of the magnetic disk 18. In other words, the ramps 29a are situated so as to gradually increase the distance from a center of a virtual plane in which a surface of the magnetic disk 18 is included. Therefore, as the carriage arms 24 rotate about the spindle 23 and are distanced from the rotary shaft of the magnetic disks 18, the load tabs 28 slide up the ramps 29a. Thus, the head sliders 26 are unloaded from above the magnetic disks 18 and retracted as they move to the outside of the magnetic disks 18. Conversely, when the carriage arms 24 rotates about the spindle 23 toward the rotary shaft of the magnetic disks, the load tabs 28 slide down the ramps 29a. The lift provided by the spinning magnetic disks 18 is exerted on the head sliders 26. The ramp member 29 and the load tabs 28 serve as a load-unload system.

The flexible printed circuit board 31 is fixed on the reverse side of the bottom plate of the base 13 as illustrated in FIG. 2. The flexible printed board unit 31 has: a first flexible printed board section 32 that is folded relatively rigidly; and the second flexible printed board section 33 whose first end is connected with the first flexible printed board section 32 and a second end thereof is affixed on the side of the carriage block 22. The first flexible printed board section 32 and the second flexible printed board section 33 are integrally formed as a single flexible printed board. The first flexible printed board section 32 is fixed onto the bottom plate of the base 13 with, for example, a pair of screws 34. The integral flexible printed board is folded orthogonally with the joint line between the first flexible printed board sections 32 and the second flexible printed board section 33. The second flexible printed board 33 extends between the first flexible printed board 32 and the carriage block 22 with its body curved. As the carriage block 22 rotates, the second flexible printed board 33 flexibly bends. The integral flexible printed board has a thin metallic plate such as a stainless steel plate, an insulation layer, a conductive layer and a protective layer from on the thin metallic plate bottom to top. The conductive layer has a wiring pattern. The insulation layer and the protective layer may be made of resin material such as polyimide.

On the first flexible printed board 32, for example, a drop sensor is mounted. The drop sensor 35 senses an acceleration of gravity. The drop sensor 35 senses a beginning of a drop of the HDD based on a loss of the acceleration of gravity, in other words, a beginning of a gravity-free state. The drop sensor 35 outputs a drop beginning signal. When the acceleration of gravity is restored, in other words, when the gravity-free state ends, the drop sensor 35 senses an end of the drop. The drop sensor 35 outputs a drop ending signal. The drop beginning signal and the drop ending signal may be the same. Because the drop begins and then ends, the drop beginning signal and the drop ending signal are distinguished by the output order of the signals. Therefore, the drop sensor 35 senses the acceleration exerted on the housing 12. A connector not illustrated in the accompanying drawings is mounted on the reverse side of the first flexible printed board section 32. The connector is connected with the printed circuit board 15.

A head amplifier 36 is mounted on the second flexible printed board section 33 attached on a side of the carriage block 22. The head amplifier 36 serves as an integrated circuit (IC). The head amplifier 36 is connected with the electromagnetic conversion element including reading and writing head elements. The head amplifier 36 and the electromagnetic head element are connected with the flexible printed board 37. The flexible printed board 37 connects with each of the flexures. The flexible printed board 37 connects with the second flexible printed board section 33 attached on the side of the carriage block 22. When reading data, the head amplifier 36 outputs a sense current to the reading head element. When writing data, the head amplifier 36 outputs a current for data writing to the writing head element. A value of the sense current is configured to a specific value.

Figure 3:
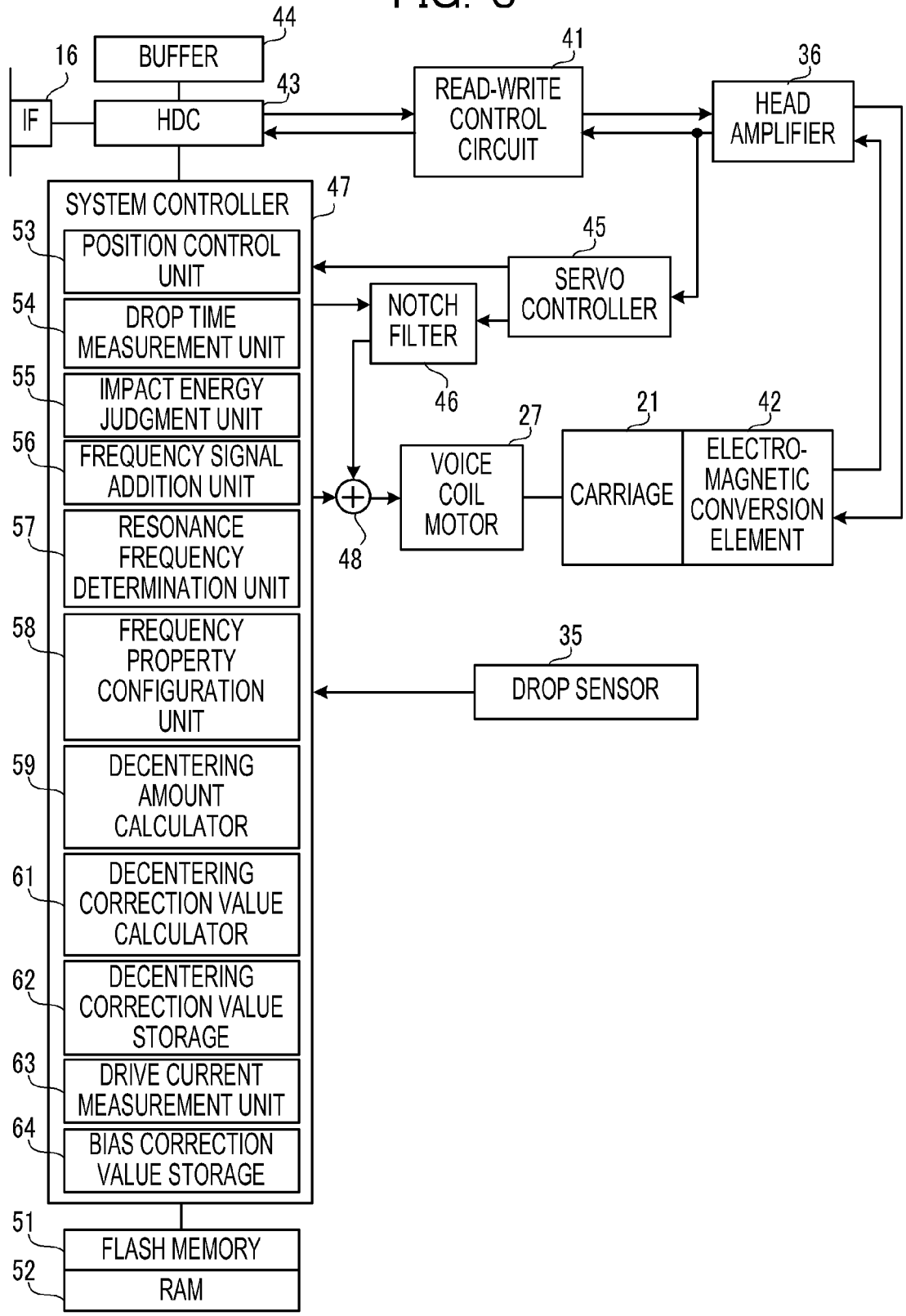
FIG. 3 is a block diagram illustrating a circuit structure of the HDD schematically.

FIG. 3 is the schematic view of the circuit structure of the HDD 11. The head amplifier 36 connects with a read-write control circuit 41. The read-write control circuit 41 produces the sense current. The sense current is amplified by the head amplifier 36. The amplified sense current is supplied to the electromagnetic conversion element 42. The read-write control current circuit 41 detects binary values according to variations of voltage of the sense current. A hard disk controller (HDC) 43 restores data according to the binary values detected by the HDC 43. The restored data are transmitted to the host through the connector 16. When transmitting data, the HDC 43 uses a buffer 44. The buffer 44 stores data temporarily.

The read-write control circuit 41 produces the current for data writing. The current for data writing is amplified by the head amplifier 36. The amplified current for data writing is supplied to the electromagnetic conversion element 42. The read-write control circuit 41 receives data from the HDC 43 to produce the current for data writing. The host sends data to the HDC 43 through connector 16. The HDC 43 uses the buffer 44 in transmitting the data. The buffer 44 stores data temporarily.

The head amplifier 36 connects with a servo controller 45. The servo controller 45 detects the variations of the voltage of the sense current according to servo patterns written on the magnetic disks 18. The servo controller 45 determines a distance between the electromagnetic conversion element 42 and the recording track according to the variation of the voltage. The servo controller 45 produces a control current according to the distance between the electromagnetic conversion element 42 and the recording track. The control current corresponds to servo signals.

The serve controller 45 connects with a frequency filter, for example, a notch filter 46. The notch filter 46 attenuates the control current in a specific frequency range. The notch filter 46 may be, for example, a digital filter. A filter coefficient of the notch filter 46 may be changed as needed. The control current outputs from the notch filter 46 are supplied to a VCM 27. The VCM 27 is driven with the supplied control current. The carriage arm 21 rotates about the spindle 23. The electromagnetic conversion element 42 is moved to a center line of the recording track. The servo controller 45 controls the VCM 27 in executing servo tracking.

The VCM 27 connects with a system controller 47. The system controller 47 controls the VCM 27 in seeking as described later. When executing the servo tracking, the system controller 47 controls VCM 27 in servo tracking in coordination with the servo controller 45. The system controller 47 executes the drop handling operation upon detecting a drop of the HDD 11. The system controller 47 controls the VCM 27 with a drive current output therefrom. The output from the notch filter 46 and the output from the system controller 47 are added by an accumulator 48.

The system controller 47 connects with a flash memory 51 and a random access memory (RAM) 52. The system controller 47 executes various processes including the control of the VCM 27 and the drop handling operation with a firmware loaded from the flash memory 51. The system controller 47 also uses the RAM 52 in executing the processes. The system controller 47 connects with the drop sensor 35 described previously. The outputs from the drop sensor 35 are supplied to the system controller 47.

The flash memory 51 stores the firmware, bias correction value data, decentering correction value data, filter coefficient data, threshold data, impact resistance budget value date, etc. The system controller 47 obtains the bias correction value data in producing the drive current. The bias correction data are descriptions of the bias correction values. Based on the bias correction value, for example, an amount of misalignment of the VCM 27 due to an external force caused when the second flexible printed board section 33 bends is derived. Thus, the electromagnetic conversion element 42 is positioned at a desired position regardless of an influence of the external force by supplying the drive current to the VCM 27 according to the bias correction value. The bias correction values are configured, for example, according to the location of the target track in the radial direction of the magnetic disk 18. The bias correction values are used in executing both seeking and servo tracking. A calculation method of the bias correction values will be disclosed later. When executing servo tracking, the system controller 47 obtains the decentering correction value data for producing the drive current. The decentering correction value data include decentering correction values. Based on the decentering correction value, a position error of the head slider 26 that is synchronized with rotations of the magnetic disks 18, in other words, repeatable runout (RRO), is derived. The position errors are determined based on the decentering amounts between a rotation center of the magnetic disk 18 and a center of the circular recording track. The decentering correction value is represented with, for example, a sin wave form in a specific amplitude. A period of the sin wave is equivalent to a revolution of the magnetic disk 18. The VCM 27 compensates for decentering of the recording track to perform accurate servo tracking with the drive current supplied thereto according to the decentering correction value. A calculation method of the decentering correction value will be disclosed later. The filter coefficient data include the filter coefficients of the notch filter 46. A frequency at the center of a notch and a depth of the notch observed in the graph illustrating the frequency property of the notch filter 46 are derived according to a filter coefficient. A configuration method of the filter coefficients will be disclosed later. The threshold data are descriptions of specific thresholds. The threshold determines an amount of impact energy. In this embodiment, the thresholds are configured to 5%, 10% and 15%. Each setting value corresponds to the impact resistance budget configured at a design phase, respectively. An amount of the impact energy is determined according to the threshold. The impact resistance budget value data include the impact resistance budget values. The impact resistance value is determined according to an index representing the amount of the impact energy. According to the impact resistance budget value, a drop height that is equivalent to the impact resistance budget is derived.

The system controller 47 has a position control unit 53. The position control unit 53 positions the electromagnetic conversion element 42 above a recording track assigned a specified number. The system controller 47 outputs the drive current to the VCM 27 for seeking the track. The position control unit 53 obtains data from the HDC 43 to specify the track number. When seeking, the servo controller 45 is not operated.

The system controller 47 has a drop time measurement unit 54. The drop time measurement unit 54 starts to measure a drop time upon receiving the drop beginning signal output from the drop sensor 35. Upon receiving the drop ending signal output from the drop sensor 35, the drop time measurement unit 54 stops measuring the drop time. The drop time measurement unit 54 outputs drop time data. According to the drop time data, the drop time is determined. The drop time is equivalent to an index that represents the amount of the impact energy.

In the system controller 47, the drop time measurement unit 54 connects with an impact energy judgment unit 55. The impact energy judgment unit 55 judges the amount of the impact energy. The impact energy judgment unit 55 obtains the threshold data and the impact resistance budget value data from the flash memory 51 to judge the amount of the impact energy. The impact energy judgment unit 55 derives the drop height corresponding to a threshold according to the threshold data and the impact resistance budget data. At the same time, the impact energy judgment unit 55 derives the drop height according to the drop time data. Finally, the drop height derived from the threshold data is checked against the drop height derived from the drop time data. Thus, the drops are classified according to the amount of the impact energy.

The system controller 47 has a frequency signal addition unit 56. The frequency signal addition unit 56 outputs a frequency signal to the VCM 27. The frequency-signal may be changed to some specific or optional variable frequencies. For example, a sin wave signal of a configured frequency is used as the frequency signals. The sin wave signal changes within a specific frequency range.

In the system controller 47, the frequency signal addition unit 56 connects with a resonance frequency determination unit 57. The resonance frequency determination unit 57 detects a resonance according to the control current supplied by the servo controller 45. The resonance frequency determination unit 57 obtains a frequency of the frequency signal according to the frequency information provided by the frequency signal addition unit 56. Thus, the resonance frequency determination unit 57 determines the resonance frequency when detecting the resonance. The resonance frequency determination unit 57 determines a gain of an oscillation caused by the resonance according to variations of the control current.

In the system controller 47, the resonance frequency determination unit 57 connects with a frequency property configuration unit 58. The frequency property configuration unit 58 configures the filter coefficient of the notch filter 46. The frequency at the center of the notch and the depth of the notch are configured according to the configured filter coefficient. At that time, the frequency property configuration unit 58 obtains the filter coefficient data from the flash memory 51. The filter coefficient configured anew is checked against the filter coefficient included in the filter coefficient data. Where the two filter coefficients are matched, the frequency property configuration unit 58 rewrites the correspondent threshold data stored in the flash memory 51. The value of the threshold data is set in specific increments. Where the two filter coefficients are not matched, the frequency property configuration unit 58 changes the filter coefficient of the notch filter 46 and writes the new filter coefficient over the filter coefficient data stored in the flash memory 51.

The system controller has a decentering amount calculation unit 59. The decentering calculation unit 59 calculates the amount of the decentering, in other words, a gap between the rotation center of the magnetic disk 18 and the center of the circular recording track. The servo controller 45 supplies the control current to the decentering amount calculation unit 59 to calculate the amount of the decentering. The control current cyclically changes by revolution of the magnetic disk 18. The amount of the decentering reflects the change of the control current. Therefore, the decentering amount calculation unit 59 calculates the amount of the decentering according to the control current supplied by the servo controller 45.

In the system controller 47, the decentering amount calculation unit 59 connects with a decentering correction value calculator 61. The decentering correction value unit calculation unit 61 calculates the decentering correction value according to the amount of the decentering calculated by the decentering amount calculation unit 59. In the system controller 47, the decentering correction value calculator 61 connects with a decentering correction value storage unit 62. The decentering correction value storage unit 62 judges whether to store the decentering correction value calculated by the decentering correction value calculator 61. The decentering correction value storage unit 62 obtains decentering correction value data from the flash memory 51 to judge whether to store the decentering correction value. The decentering correction value calculated by the decentering correction value calculator 61 is checked against the decentering correction value data. Where the two decentering correction values are matched, the decentering correction value storage unit 62 rewrites the correspondent threshold data stored in the flash memory 51. The value of the threshold is set in specific increments. Where the two recent ring correction values are not matched, the decentering correction value storage unit 62 writes the decentering correction value calculated by the decentering correction value calculator 61 over the decentering correction value stored in the flash memory 51.

The system controller 47 has a drive current measurement unit 63. The drive current value measurement unit 63 measures the value of the drive current supplied to the VCM 27 when the electromagnetic conversion element 42 seeks the specified recording track. The measured current value is equivalent to the bias correction value. When the electromagnetic conversion element 42 is maintained above the recording track at a specific rotation angle in seeking, the drive force produced by the drive current balances with the drive force attributed by the external force. Thus, when the drive current is supplied to the VCM 27 according to the bias correction value, the electromagnetic conversion element 42 is maintained above the recording track although the electromagnetic conversion element 42 is subjected to the external force. Without supplying the drive current, the electromagnetic conversion element 42 is distanced from the recording track due to the external force. The servo controller 45 does not supply the control current to the VCM 27 when measuring the drive current. The position of the electromagnetic conversion element 42 is judged according to the control current supplied by the servo controller 45 to the drive current value measurement unit 63. The value of the current may be measured at multiple points in the radial direction of the magnetic disk 18.

In the system controller 47, the drive current value measurement unit 63 connects with a bias correction value storage unit 64. The bias correction value storage unit 64 judges whether to store the value of the current, in other words, the bias correction value, measured by the drive current value measurement unit 63. The bias correction value storage unit 64 obtains the bias correction value data stored in the flash memory to judge whether to store the bias correction value. The bias correction value measured by the drive current value measurement unit 63 is checked against the bias correction value data. Where the two bias correction values are matched, the bias correction value storage unit 63 rewrites the correspondent threshold data stored in the flash memory 51. The value of the threshold is set in specific increments. Where the two bias correction values are not matched, the bias correction value storage unit 64 writes the bias correction value measured by the drive current value measurement unit 63 over the bias correction value stored in the flash memory 51.

Figure 4:
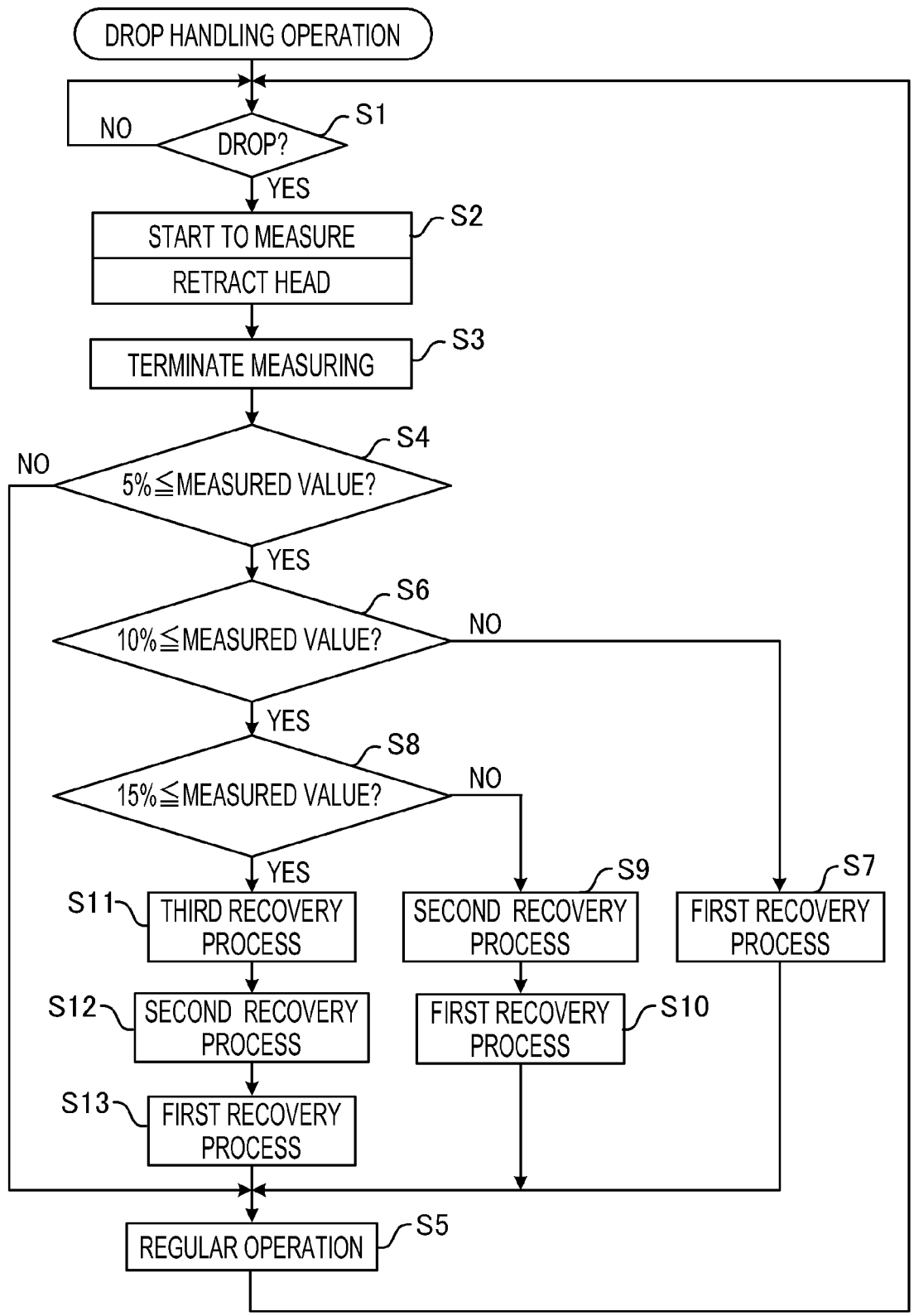
FIG. 4 is a flow chart illustrating a drop handling operation.

The drop handling operation executed by the system controller 47 will be described with reference to FIG. 4. First, whether the HDD is dropped or not is judged in step S1. When the drop sensor 35 outputs the drop beginning signal, the system controller 47 recognizes that the HDD 11 is dropping. Upon receiving the drop beginning signal, the drop time measurement unit 54 starts to measure a drop time in step S2. At the same time, the head is retracted. More specifically, the position control unit 53 supplies the drive current to the VCM 27. The VCM 27 rotates the carriage 21 about the spindle 23 with the supplied drive current. Consequently, the head sliders 26 are retracted from above the magnetic disks 18 and the load tabs 28 are caught in the ramp member 29. Upon receiving a drop ending signal from the drop sensor 35, measuring the drop time is terminated in step S3 and the process moves on to step S4.

The impact energy judgment unit 55 judges the amount of the impact energy in step S4. The drop time is converted into the drop height to judge the amount of the impact energy. To convert the drop time into the drop height, the acceleration of gravity is used. When the measured value is less than 5% of the impact resistance budget value, the system controller 47 resumes the regular operation on step S5. Then the drop handling operation is completed.

Figure 5:
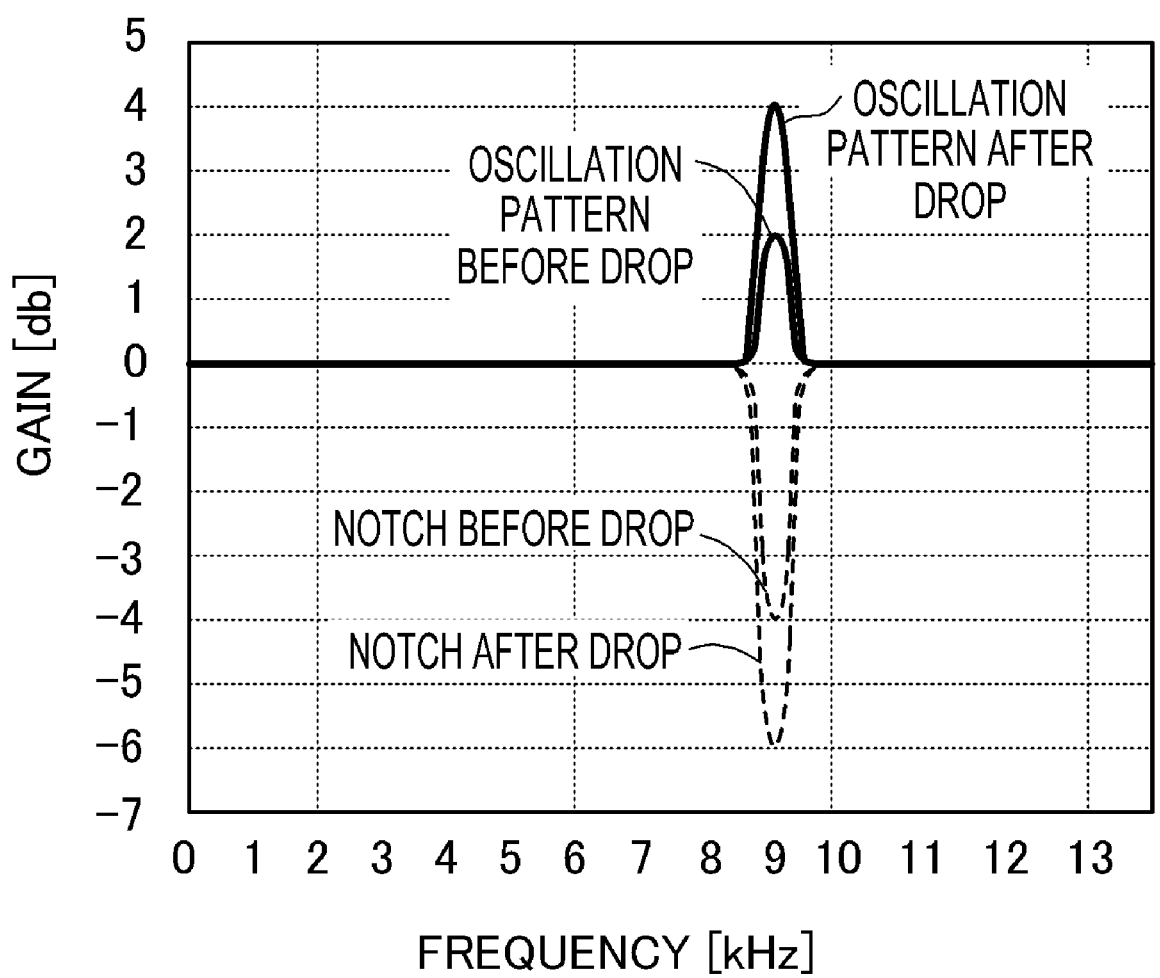
FIG. 5 is a graph illustrating an example of a frequency property of a notch filter and oscillation patterns before and after the HDD is dropped.
Figure 6:
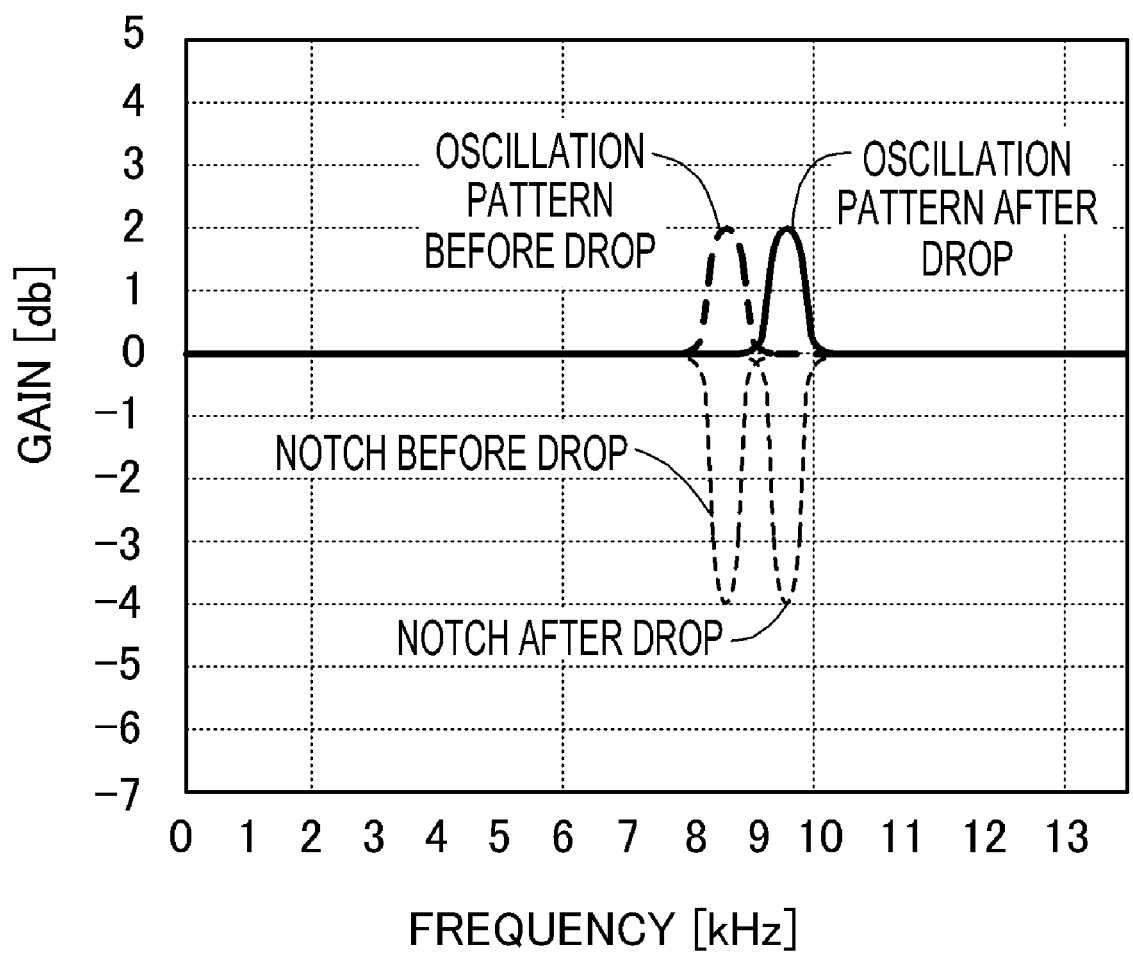
FIG. 6 is a graph illustrating an example of the frequency property of the notch filter and oscillation patterns before and after the HDD is dropped.

The impact energy judgment unit 55 judges the amount of the impact energy in step S6. Where the measured value falls within a range from 5% to less than 10% of the impact resistance budget value, the system controller 47 selects a first recovery process and the process moves on to step S7. The resonance frequency is recalculated in the first recovery process. In the first recovery process, the electromagnetic conversion element 42 is positioned above an arbitrary recording track by the position control unit 53. Then the servo controller 45 executes the servo tracking. The frequency signal addition unit 56 supplies the frequency signal to the VCM 27. The frequency of the frequency signal gradually changes. The head sliders 26 vibrate largely at a specific frequency. As a result, the control current supplied by the servo controller 45 is amplified largely. Therefore, the resonance is detected. The resonance frequency determination unit 57 specifies the resonant frequency according to the frequency information. At the same time, the resonance frequency determination unit 57 determines a gain according to the amplitude of the vibration. The frequency property configuration unit 58 calculates the filter coefficient of the notch filter 46 according to the determined resonance frequency and the gain. The calculated filter coefficient is checked against the filter coefficient data. Where the two filter coefficients are matched, the frequency property configuration unit 58 rewrites the correspondent threshold stored in the flash memory 51. For example, the threshold is changed from 5% to 6%. Where the two filter coefficients are not matched, the frequency property configuration unit 58 changes the filter coefficient of the notch filter 46 and writes the newly configured filter coefficient over the filter coefficient stored in the flash memory. For example, when the resonance frequency does not change and the gain increases as illustrated in FIG. 5, the depth of a notch is deepened with the notch filter 46 according to the configured filter coefficient. The frequency at the center of the notch is unchanged. Where the gain does not change and the resonance frequency shifts, the frequency at the center of the notch is shifted with the notch filter 46 according to the configured filter coefficient. However, the depth of the notch is unchanged. Thus, the filter coefficient is changed according to the change of the resonance frequency or the gain. Then the process moves on to step S5 and the system controller 47 resumes the regular operation as well as the case previously mentioned. The drop handling operation is completed.

The impact energy judgment unit 55 rejudges the amount of the impact energy in step S8. When the measured value falls within a range from 10% to less than 15% of the impact resistance budget value, the system controller 47 selects a second recovery process. Then the process moves on to step S9. In the second recovery process, the decentering correction value is recalculated. First, the electromagnetic conversion element 42 is positioned above an arbitrary recording track by the position control unit 53. The decentering amount calculation unit 59 calculates the decentering amount according to the control current output from the servo controller 45. The decentering correction value calculator 61 calculates the decentering correction value according to the decentering amount. The decentering correction value storage unit 62 checks the calculated decentering correction value against the decentering correction value data. When the two decentering correction values are matched, the decentering correction value storage unit 62 rewrites the threshold stored in the flash memory 51. For example, the threshold is changed from 10% to 11%. When the two decentering correction values are not matched, the decentering correction value storage unit 62 writes the decentering correction value calculated by the decentering correction value calculator 61 over the decentering correction data stored in the flash memory 51. Then the system controller 47 executes the first recovery process in step S10. After the first recovery process is completed, the system controller 47 resumes the regular operation as mentioned above. Then the drop handling operation is completed.

When the measured value is confirmed to be greater than or equal to 15% of the impact resistance value in step S8, the system controller 47 selects a third recovery process and the process moves on to step S11. In the third recovery process, the bias correction value is recalculated. First, the electromagnetic conversion element 42 is positioned above an arbitrary recording track by the position control unit 53. The drive current value measurement unit 63 calculates the value of the drive current, in other words, the bias correction value. The bias correction value storage unit 64 checks the calculated bias correction value against the bias correction value data. When the two bias correction values are matched, the bias correction value storage unit 64 rewrites the correspondent threshold stored in the flash memory 51. For example, the threshold is changed from 15% to 16%. When the two bias correction values are not matched, the bias correction value storage unit 64 writes the bias correction value calculated by the drive current value measurement unit 63 over the bias correction value stored in the flash memory 51. Then the system controller 47 executes the second recovery process in step S12. After completing the second recovery process, the system controller 47 executes the first recovery process in step S13. After completing the first recovery process, the system controller 47 resumes the regular operations as mentioned above. Then the drop handling operation is completed.

Accordingly, the first though third recovery processes are selected and executed according to the drop height after retracting the heads. Therefore, the processes needed to be performed after retracting the head sliders may be simplified to a minimum. In other words, only the optimum processes need be executed reliably. As a result, the process time after retracting the head sliders, in other words, the recovery process time, may be reduced in comparison with a case in which the drop handling operation is executed after retracting the head sliders irrespective of the drop height.

Moreover, the threshold stored in the flash memory 51 is rewritten when the filter coefficients are matched in the drop handling operation. Likewise, the decentering correction value stored in the flash memory 51 is rewritten to achieve a more accurate threshold when the decentering correction values are matched or the bias correction values are matched. As a result, the drop handling operation may be simplified to a minimum.

The drop sensor 35 may be substituted with an impact sensor, or used in combination with the impact sensor. Checking the filter coefficients, the decentering correction values or the bias correction values is not limited to being performed once. For example, the threshold stored in the flash memory 51 might not be rewritten until the filter coefficient and the filter coefficient, the decentering correction value and the decentering correction value or the bias correction value and the bias correction value are matched in consecutive checks.

The storage medium driving apparatus in an embodiment has: the head sliders opposed to the storage media; the acceleration detector for detecting an acceleration; and the control circuit for selectively executing one or more processes from among the multiple kinds of processes according to the index that is derived from the result detected by the acceleration detector and represents the amount of the impact energy.

For the storage medium driving apparatus, the processes are executed selectively according to the amount of the impact energy. Therefore, the process after a drop impact may be simplified to a minimum. Thus, only the optimum processes need be executed reliably. As a result, the process time after retracting the head sliders, in other words, recovery process time may be reduced in comparison with a case in which the drop handling operation is executed after retracting the head sliders irrespective of the drop height. Thus, the storage medium driving apparatus may resume the optimal processes reliably in the shortest period of time after the storage medium driving apparatus is subjected the drop impact.

The drop sensor for detecting a drop of the apparatus by detecting the gravity-free (falling) state may be used as the acceleration detector. The control circuit measures the drop time from when the gravity-free state begins to when the gravity-free state ends. The control circuit selects and executes one or more processes from among the multiple kinds of processes mentioned above according to the measured drop time. Generally, the drop sensor has a simple structure and is available at an affordable price. In addition, the drop sensor may be incorporated in the confined space. Alternatively, the impact sensor may be used as the acceleration detector instead of the drop sensor. The amount of the impact energy may be determined more accurately with the impact sensor.

The control circuit may include: the frequency signal addition unit for adding the frequency signal that changes at the specific frequency to the servo signal output from the head slider;

the resonance frequency determination unit for determining the resonance frequency according to the behavior of the head slider; and the frequency property configuration unit for configuring the frequency property of the frequency filter for filtering the predefined frequency from the servo signal output from the head slider. Therefore, the tracking accuracy of the head slider may be ensured by changing the filter coefficient when the resonance frequency generated from the head slider and its peripheral components is changed by the drop impact.

Further, the control circuit may include: decentering amount calculation unit for calculating the decentering amount of the storage media; the decentering correction value calculator for calculating the decentering correction value added to the servo signal output from the head slider according to the calculated decentering amount; and the decentering correction value storage unit for storing the calculated decentering correction value onto the memory. The tracking accuracy of the head slider may be ensured by changing the decentering correction value when the decentering amount of the storage media is changed by the drop impact.

Further, the control circuit may include: the positioning controller for positioning the head slider according to the positioning signal output from the head slider; the drive current value measurement unit for measuring the value of the current used for driving the head slider to a target position; and the current value storage unit for storing the measured current value onto the specific memory. Therefore, the tracking accuracy of the head slider may be ensured by changing the value of the current when the resonance frequency generated from the head slider and its peripheral components is changed by the drop impact.

The control method for achieving the storage medium driving apparatus mentioned above may include, for example: a step for detecting the acceleration which the storage media and the head sliders undergo by the acceleration detector; a step for retracting the head slider from above the storage media according to the result detected by the acceleration detector; and a step for selectively executing one or more processes from among the multiple kinds of processes according to the index derived from the detected result of the acceleration detector and representing the amount of the impact energy after the head sliders are retracted.

The storage medium driving apparatus in another embodiment has: the head sliders opposed to the storage media; the acceleration detector for detecting acceleration exerted onto the storage media and the head sliders; the memory storing the predefined threshold and the specific correction values relating to the head slider positioning signals according to the index representing the amount of the impact energy; and the control circuit for checking the index derived from the detection result detected by the acceleration detector and comparing the amount of the impact energy against the predefined threshold stored onto the memory, and calculating the current correction value, which corresponds to the specific correction value, for the head slider positioning signal according to the comparison between the index and the threshold, and rewriting the predefined threshold stored onto the memory where the calculated current correction value matches the specific correction value.

For the storage medium driving apparatus described above, a change of the correction value may be predicted based on the acceleration when the storage media and the head sliders are subjected to the acceleration and the drop impact. To predict the change of the correction value, the comparison between the index and the threshold is used. When the calculated correction value matches the stored correction value, the threshold is judged as inappropriate and is rewritten to achieve a more accurate threshold. As a result, the drop handling operation may be simplified to a minimum.

The control method to achieve the storage medium driving apparatus described above includes, for example: a step for detecting the acceleration exerted onto the storage media and the head sliders by the acceleration detector; a step for obtaining the threshold configured according to the index representing the amount of the impact energy; a step for checking the index that is derived from the result detected by the acceleration detector and represents the amount of the impact energy against the obtained threshold, and calculating the current correction value for the head slider positioning signal according to the comparison between the index and the threshold; a step for obtaining the specific correction value relating to the head slider positioning signal from the storage medium according to the current correction value; and a step for rewriting the threshold stored onto the memory when the calculated correction value matches the obtained specific correction value.

Accordingly, the storage medium driving apparatus for recovering to the optimum operational state in the shortest period of time after an impact may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage medium driving apparatus driving a storage medium, comprising:
    a head slider opposed to the storage medium;
    an acceleration detector detecting an acceleration; and
    a control circuit retracting the head slider from above the storage medium according to a result detected by the acceleration detector, the control circuit selectively executing one or more operations from among a plurality kinds of operations according to a stored index that is derived from the result detected by the acceleration detector and represents an amount of an impact energy;
    wherein the control circuit comprises a frequency signal addition unit adding a frequency signal that changes at a specific frequency to a servo signal output from the head slider, a resonance frequency determination unit determining a resonance frequency based on a behavior of the head slider and a frequency property configuration unit configuring a frequency property of a frequency filter filtering a predefined frequency from the servo signal output from the head slider according to the specified resonance frequency.

2. The storage medium driving apparatus according to claim 1,
    wherein the acceleration detector is a drop sensor detecting a drop of the storage medium driving apparatus by detecting a gravity-free state, and
    wherein the control circuit measures a drop time according to a beginning and an ending of the gravity-free state, and selectively executes one or more operations from among the plurality kinds of the operations according to the measured drop time.

3. The storage medium driving apparatus according to claim 1, wherein the acceleration detector uses an impact sensor detecting an impact, and wherein the control circuit selectively executes one or more operations from among the plurality kinds of the operations according to a result detected by the impact sensor.

4. The storage medium driving apparatus according to claim 1, wherein the control circuit comprises a decentering amount calculator calculating a decentering amount of the storage medium, a decentering correction value calculator calculating a decentering correction value added to the servo signal output from the head slider according to a calculated decentering amount and a decentering correction value storage unit storing the calculated decentering correction value in a memory.

5. The storage medium driving apparatus according to claim 1, wherein the control circuit comprises a positioning controller positioning the head slider according to the head slider positioning signal, a drive current measurement unit measuring a current value used for driving the head slider to a target position and a current value storage unit storing a measured current value onto a specific memory.

6. A control method of a storage medium driving apparatus, comprising:
   detecting an acceleration subjected to the storage medium and a head slider by an acceleration detector;
   retracting the head slider from above the storage medium according to a result detected by the acceleration detector;
   selectively executing one or more operations from among a plurality kinds of operations according to an index that is derived from the result detected by the acceleration detector and represents an amount of impact energy after retracting the head slider;
   adding a frequency signal that changes at a specific frequency to a servo signal output from the head slider;
   specifying a resonance frequency based on a behavior of the head slider; and
   configuring a frequency property of a frequency filter filtering a predefined frequency from the servo signal output from the head slider according to the specified resonance frequency.

7. The control method of the storage medium driving apparatus according to claim 6, further comprising:
   determining a beginning and an ending of the gravity-free state according to an output from a drop sensor detecting a drop of an HDD by detecting a gravity-free state;
   measuring a drop time based on the determined beginning and ending of the gravity-free state; and
   selectively executing the one or more operations based on the measured drop time.

8. The control method of the storage medium driving apparatus according to claim 6, further comprising:
   calculating a decentering amount of the storage medium;
   calculating a decentering correction value added to the servo signal output from the head slider according to the calculated decentering amount; and
   storing the calculated decentering correction value in a memory.

9. The control method of the storage medium driving apparatus according to claim 6, further comprising:
   positioning the head slider according to a head slider positioning signal;
   measuring a current value used for driving the head slider to a target position; and
   storing the measured current value in a memory.

10. A storage medium driving apparatus driving a storage medium, comprising:
   a head slider opposed to a storage medium;
   an acceleration detector detecting an acceleration subjected to the storage medium and the head slider;
   a memory storing a predefined threshold and a specific correction value relating to a head slider positioning signal according to an index representing an amount of impact energy;
   a control circuit checking the index that is derived from a result detected by the acceleration detector against the predefined threshold, and calculating a current correction value, which corresponds to the specific correction value, for the head slider positioning signal according to the comparison between the index and the predefined threshold, and rewriting the predefined threshold when the calculated correction value matches the specific correction value.

* * * * *